Nov. 11, 1952  B. SECKER  2,617,857
IMPEDANCE MEASURING DEVICE
Filed April 25, 1947  2 SHEETS—SHEET 1
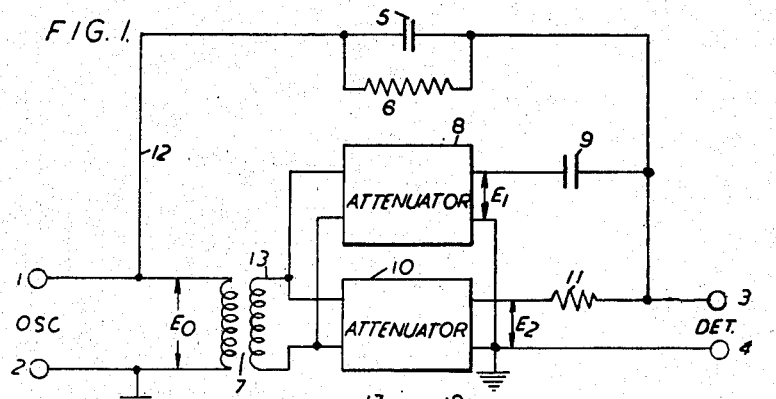
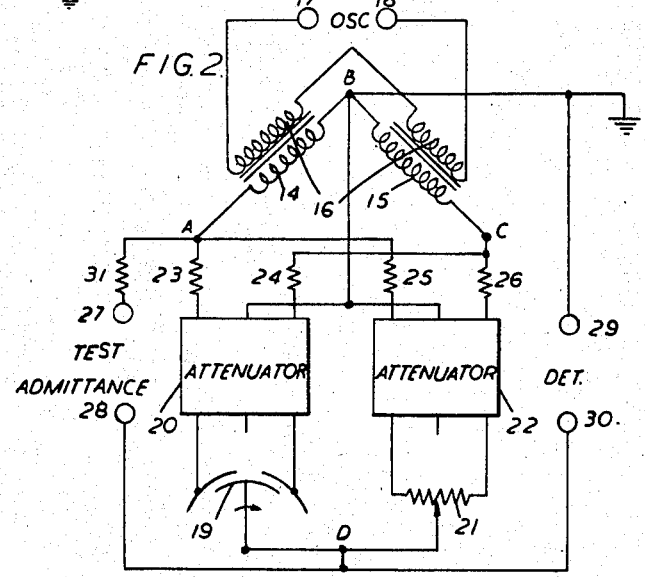
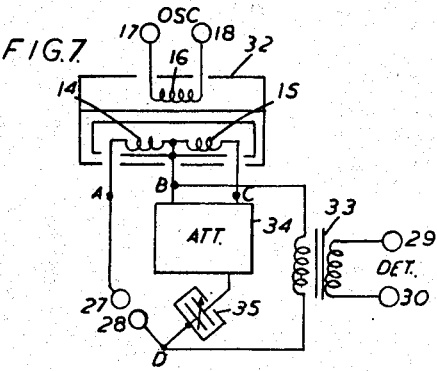
Inventor
Ben Secker
By
E. H. Plumley
Attorney

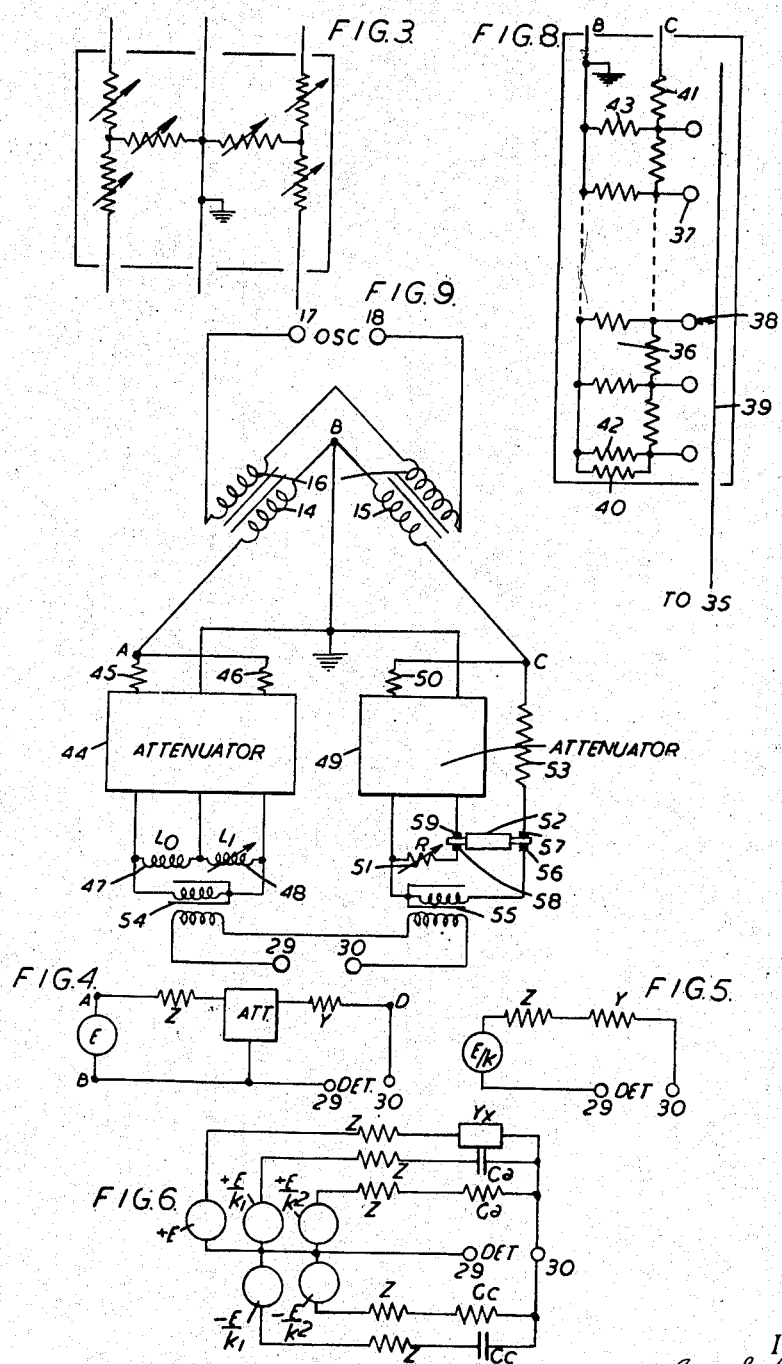

Patented Nov. 11, 1952

2,617,857

UNITED STATES PATENT OFFICE 2,617,857

IMPEDANCE MEASURING DEVICE

Ben Secker, London, England, assignor to International Standard Electric Corporation, New York, N. Y., a corporation of Delaware Application April 25, 1947, Serial No. 744,011
In Great Britain February 14, 1946

Section 1, Public Law 690, August 8, 1946
Patent expires February 14, 1966

11 Claims. (Cl. 175—183)

1

The present invention relates to arrangements for measuring electrical admittances or impedances, and is applicable more particularly when very low admittances or very low impedances are to be measured.

There are two principal difficulties in measuring very low or very high impedances by the usual bridge methods. Firstly, the design and construction of impedance or admittance standards which can be used with equal ratio bridges becomes very troublesome when extreme values are necessary; or alternatively large bridge ratios have to be employed and this introduces errors difficult to estimate and control. Secondly, it is difficult to avoid including in the measurement some additional stray impedance or admittance of uncertain or variable amount contributed by or associated with the means for connecting the element to be measured to the circuit.

For these reasons, a measuring circuit has already been proposed for measuring a very high impedance (such for example as a capacity of less than $0.1\mu\mu f.$) in which attenuators are employed effectively to divide by suitable factors the capacity and conductance of standards having values large enough to be conveniently constructed. While this arrangement employs a null method of measurement, it is not properly a bridge arrangement.

The arrangement of the present invention was however developed from a well known equal ratio bridge and takes advantage of the accuracy with which a three-winding transformer may be balanced. One or more attenuators are introduced according to the principles of the known arrangement just described in order to enable standards of a convenient size to be used in an equal ratio bridge. One arrangement is used for measuring very high impedances (low admittances) and a reciprocal or inverse arrangement employing the same principles is used for measuring very low impedances.

The invention accordingly provides an electrical admittance or impedance bridge comprising two equal ratio arms formed by two equal, balanced, and closely coupled inductive windings, means for connecting one of the said balanced windings to the admittance or impedance to be measured, one or more standard admittances or impedances, at least one of which is connected to the other balanced winding through an attenuator, means for applying test voltages to the test admittance (or for supplying test currents to the test impedance), and to all the standard admittances or impedances, and means for indicating when the algebraic sum of the currents in all the admittances (or the voltages across all the impedances) is zero.

The invention also provides an electrical admittance or impedance bridge comprising two equal, balanced, and closely coupled inductive windings forming equal ratio arms, means for connecting the admittance or impedance to be measured to one of the said windings, means for connecting one or more standard admittances or impedances to the said windings, an attenuator being included in at least one of the connections, means for supplying test currents to all of the said admittances in parallel (or for applying test voltages to all of the said impedances in series), and means for indicating when the algebraic sum of the electromotive forces or currents induced in the said inductive windings is zero.

The invention will be described with reference to the accompanying drawings in which:

Figure 1 shows an example of the known measuring circuit referred to above;

Figure 2 shows a schematic circuit diagram of an admittance bridge according to the invention;

Figure 3 shows the circuit of an attenuator employed in the circuit of Figure 2;

Figures 4, 5 and 6 show diagrams used in explaining the action of Figure 2;

Figure 7 shows a simple capacity bridge according to the invention;

Figure 8 shows a circuit diagram of the attenuator used in Figure 7; and

Figure 9 shows a schematic circuit diagram of a bridge for measuring low impedances according to the invention.

Figure 1 shows an example of the known arrangement for measuring low admittances referred to above. An oscillation generator (not shown) is intended to be connected to two input terminals 1, 2, and a detector (also not shown) to the two output terminals 3, 4. The two pairs of terminals are connected by three parallel paths, one of which includes the unknown admittances represented as a condenser 5 shunted by a resistance 6. The other two paths are connected through a phase reversing transformer 7 and include respectively an attenuator 8 and a standard condenser 9, and a second attenuator 10 and a standard conductance 11. The windings of the transformer 7 should be equal and should not be poled so that the voltages with respect to ground supplied to conductors 12 and 13 are in opposite phase. Then the two attenuators may be independently adjusted so that no current flows through the detector. It can be shown that in these circumstances $$C_x = E_1 C/E_0, \text{ and } G_x = E_2 G/E_0$$

where $C_x$ and $C$ are the unknown and standard capacities, and $G_x$ and $G$ are the unknown and standard conductances, respectively, and $E_0$, $E_1$ and $E_2$ are the voltages at the output of the oscillator and attenuators 8 and 10, respectively. The ratios $E_1/E_0$ are $E_2/E_0$ are given by the attenuator settings which may be calibrated in terms of the fractional multiplying ratio, if desired.

Figure 2 shows an example of an equal ratio bridge according to the invention for measuring low admittances, and incorporating attenuators for effectively dividing the standard admittances.

The ratio arms AB, BC of the bridge are formed by the two balanced windings 14 and 15 of a three-winding transformer, the primary winding 16 of which is connected to input terminals 17 and 18 for the test oscillator (not shown). A variable differential condenser 19 has the movable set of plates connected to the corner D of the bridge, and the sets of fixed plates are connected respectively to the corners A and C through a balanced attenuator 20, the neutral or ground conductor of which is connected to the corner B. A variable differential conductance element 21 likewise has the movable contact connected to the corner D, and the extremities are connected respectively to the corners A and C through a second balanced attenuator 22, also having its central conductor connected to the corner B. The two attenuators 20 and 22 comprise variable H type balanced networks of the kind shown in Figure 3. The equivalent type in which each balanced half is an adjustable $\pi$ type network could also be used.

Both halves of both attenuators should have the same characteristic impedance Z, and if the attenuators are adjustable, Z should be constant. The corners A and C should both be connected to both attenuators through corresponding resistance elements 23, 24, 25 and 26 each having a resistance Z. Terminals 27 and 28 for the test admittance which is to be measured are connected to the corners A and D and terminals 29 and 30 connected to the corners B and D are provided for the usual detector (not shown). A resistance element 31 having a resistance Z is shown connected between terminal 27 and the corner A of the bridge. As will be pointed out later, this element can be omitted without introducing any appreciable error. The corner B of the bridge is preferably connected to ground.

The bridge is balanced by setting the attenuators appropriately and then adjusting elements 19 and 21 until the detector shows no current. It will be shown that the value of the admittance being measured is substantially equal to $$(G_c - G_a)/k_2 + j\omega(C_c - C_a)/k_1$$

where $G_c - G_a$ and $C_c - C_a$ are the differences between the conductance and capacity, respectively, effectively introduced by the elements 19 and 21 into the C and A sides of the bridge, and $k_1$ and $k_2$ are the ratios of the input and output voltages of the attenuators 20 and 22, respectively.

The windings 14 and 15 of the transformer should be accurately balanced and should be very closely coupled. For example, they may be constructed by winding a twisted pair on a suitable magnetic core. Under these conditions it can be shown by solving the bridge network according to known principles that when the elements of the bridge are adjusted so that no current flows in the detector, each winding presents a substantially zero impedance.

Figure 4 shows the equivalent circuit of one half of the bridge shown in Figure 2, including one half of the attenuator 20. The winding 14 produces an electromotive force E, and as just mentioned is of zero impedance when the bridge is balanced. The electromotive force E is applied to the input side of the half-attenuator through an impedance Z, and the output of the half-attenuator is connected through an admittance Y to the detector terminals 29 and 30. This arrangement is well known to be identically equivalent to the circuit shown in Figure 5 in which the attenuator has been eliminated and the electromotive force reduced to $E/k$, where $k$ is the voltage attenuation factor produced by the half-attenuator. It will be evident that the whole bridge will be equivalent to Figure 6, in which $Y_x$ is the unknown admittance, $G_a$ and $G_c$ are the conductances introduced by the element 21 into the two sides of the bridge, $C_a$ and $C_c$ are the capacities introduced by the element 19 into the two sides of the bridge, and $k_1$ and $k_2$ are the voltage attenuation factors introduced by the attenuators 20 and 22 respectively. The electromotive forces on the C-side of the bridge will evidently be of opposite sign to those on the A-side, since the windings 14 and 15 produce voltages of opposite sign at the corners A and C.

It will be evident that the condition for zero current in the detector is $$E/(Z+1/Y_x) + E/k_1(Z+1/j\omega C_a) + \\ E/k_2(Z+1/G_a) = E/k_1(Z+1/j\omega C_2) + \\ E/k_2(Z+1/G_c) \quad (1)$$

Now the impedance Z should be chosen to be small compared with any of the impedances in the AD or CD arms of the bridge. For example, Z can be 50 ohms, while if, for example, the capacity $C_a$ is 10$\omega\omega$f., and $\omega$ is 10,000 then the impedance $1/j\omega C_a$ is about $10^7$ ohms, so that the error obtained in neglecting Z is quite inappreciable. The Equation 1 therefore reduces to $$Y_x = (G_c - G_a)/k_2 + j(C_c - C_a)/k_1 \quad (2)$$

Since $Y_x$ is small compared with any of the other admittances, it is obvious that the element 31 of Figure 2 can be omitted. The elements 23 to 26 cannot, however, be omitted because they are necessary for properly terminating the input circuits of the attenuators.

It will be clear that Equation 1 may be directly generalised for any number of parallel attenuator arrangements on each side of the bridge, in the form:

$$\Sigma E/k_a(Z+1/Y_a) = \Sigma E/k_c(Z+1/Y_c) \quad (3)$$

or $$\Sigma 1/k_a Y_a = \Sigma 1/k_c Y_c \quad (4)$$

neglecting Z. In these equations $Y_a$ and $Y_c$ represent any one of the admittances on the A and C sides of the bridge, respectively and $k_a$ and $k_c$ the corresponding attenuation factors of the attenuators to which they are connected.

It is convenient to arrange so that the attenuators 20 and 22 produce attenuations in steps of 10 decibels. Then the corresponding voltage attenuation factors will then be integral powers of $\sqrt{10} = 3.162$. The elements 19 and 21 can each be provided with two scales graduated in the ratio 3.162 to 1, so that, for example, a reading near the lower end of one scale can be transferred to the upper end of the other by adjusting the corresponding attenuator by one step. Then by reading on the appropriate scale the dividing factor will always be a power of ten. To make this arrangement clearer, suppose that the condenser 19 is such that the maximum capacity difference $C_c - C_a$ which can be produced is a little over 10 $\mu\mu f$. Then there will be a black scale graduated from 0 to 10 $\mu\mu f$. and a red scale graduated from 0 to about 3.5 $\mu\mu f$. in such manner that the graduation 1 on the red scale corresponds to 3.162 on the black scale. Then if, for example, the test admittance were a condenser of 0.3 $\mu\mu f$. capacity, a reading of 3 $\mu\mu f$. would be obtained near the lower end of the black scale with 20 decibels attenuation, and this would become 3 $\mu\mu f$. near the upper end of the red scale with 30 decibels attenuation. Thus the 20 decibel step on the attenuator 20 would be marked 0.1 Black and the 30 decibel step would be marked 0.1 Red. The 40 and 50 decibel steps would be marked 0.01 Black and 0.01 Red respectively, and so on. Thus the reading should be made on the scale indicated by the designation of the attenuator step, and the corresponding multiplying factor should be used.

It will be seen that this arrangement enables a reading always to be obtained somewhere on the upper two-thirds of one of the scales, thus avoiding the lack of precision of readings at the lower end of the scale.

It will be noted that the ground admittance of the terminal 27 will be substantially short-circuited since the winding 14 has no impedance at balance (the element 31 being omitted as mentioned above), and the ground admittance of the terminal 28 acts across the detector, and therefore has no effect on the balance. It follows that the bridge measures substantially the direct admittance which is connected between the terminals 27 and 28.

Figure 7 shows a simplified bridge, which is a special case of Figure 2, for measuring the capacities of small condensers, in cases where no conductance balance is necessary. A double-screened three-winding transformer 32 is used with closely coupled and balanced secondary windings. The detector is connected to the corners B and D of the bridge by a suitable output transformer 33. The terminals 27 and 28 for the test condenser are connected directly to the corners A and D respectively, and an unbalanced attenuator 34 has its input circuit connected to the terminals B and C and an adjustable output tap is connected to the variable simple condenser 35 which is connected to the D corner as shown. If Q is the capacity of the condenser 35 at balance, and $k$ is the voltage attenuation ratio, then the capacity $Q_x$ of the test condenser will be $Q/k$.

The attenuator may be of the kind shown in Figure 8. It consists of a ladder of similar $\pi$ network sections such as 36 each adapted to produce a loss of 10 decibels, for example. Tapping terminals 37 are provided at the junctions of each pair of adjacent $\pi$ sections. A sliding contact 38 enables the output conductor 39 to be connected to any one of the terminals 37. Input and output terminating resistances 40 and 41 equal to the characteristic impedance of the attenuator are provided as shown. The resistance 41 corresponds to the resistance 24 of Figure 2.

Thus in the case of an attenuator having a characteristic impedance of 50 ohms, each section may consist of two shunt resistances each 96.2 ohms and one series resistance of 71.1 ohms. Every pair of adjacent shunt resistances may clearly be combined to form a single resistance of 48.1 ohms, so that all the shunt resistances in Figure 8 will be 48.1 ohms, except the two end ones 42 and 43 which will be 96.2 ohms. Resistances 40 and 42 could, if desired, be combined in a single resistance of 32.9 ohms. This produces an attenuator variable in steps of 10 decibels (voltage attenuation ratio 3.162 per step). By providing eight 10-decibel steps for the attenuator and two scales on the condenser 35 as explained with reference to Figure 2, it will be possible for example, to measure capacities down to about 0.01 $\mu\mu f$. using a condenser 35 having a range 0 to 250 $\mu\mu f$.

It will be understood that the accuracy of the measurement by the method of Figure 2 or Figure 7 will be limited mainly by the accuracy with which it is practicable to construct the attenuators, and this is probably of the order of a few per cent. In cases where this method is intended to be used, that is, where the admittances involved are very small, the error introduced by neglecting Z in Equation 1, for example, is quite negligible in comparison with the errors of the attenuators. When the admittances are so large that this assumption cannot be made, other well known methods of measurement should preferably be employed, and the method of the invention is no longer suitable. The method of the invention is intended for use when the conventional methods fail for the reasons explained.

Figure 9 shows the manner in which the principles of the invention may be applied to an arrangement for measuring very low impedances. The input transformer 14, 15, 16 is arranged in the same way as in Figure 2. A balanced adjustable attenuator 44 of the kind shown in Figure 3, for example, each half of which has a constant characteristic impedance Z, has the neutral or ground conductor connected to the earthed B corner of the bridge, and both input conductors connected to the corner A through resistance elements 45 and 46 of resistance Z. The output of one half of the attenuator 44 is connected to a fixed inductance element 47 ($L_0$), and the output of the other half to a variable inductance element 48 ($L_1$) which should preferably have a constant resistance equal to that of 47.

An unbalanced variable attenuator 49 of constant impedance Z has its neutral conductor connected to corner B, and its input conductor is connected through a resistance element 50 of resistance Z to corner C. An adjustable standard resistance 51 (R) is connected to the output of the attenuator 49, and the low impedance 52 ($Z_x$) which is to be measured, has one terminal connected to ground, and the other to corner C through a resistance element 53 of resistance Z.

Two identically similar output transformers 54 and 55 are provided. The primary winding of 54 is connected to the two output conductors of the balanced attenuator 44, and the primary winding of 55 is connected between the output conductor of the attenuator 49 and the resistance element 53. The two secondary windings are connected in series to terminals 29 and 30 for the detector.

The unknown impedance 52 is preferably connected to the circuit in the manner indicated, or by an equivalent arrangement. Contact springs 56, 57, 58 and 59 are connected respectively to the primary winding of the transformer 55, to the resistance 53, to the standard resistance 51 and to the neutral or earth conductor of the attenuator 49. The impedance 52 has two blade terminals which are gripped between the springs 56 and 57, and between the springs 58 and 59. As will be explained later, this distributes the contact resistance in such a manner that they do not appreciably affect the measurement of $Z_x$.

In making the balance, the elements R and $L_1$ are adjusted until no current flows in the detector. This means that the voltage drop across the unknown impedance $Z_x$ is equal to the voltage drop across R plus the difference between the voltage drops across the inductances $L_0$ and $L_1$.

It will be evident from what has been explained with reference to Figure 2 that the condition for balance is $$EZ_x/(Z+Z_x) = ER/k_2(Z+R) + Ej\omega L_1/k_1 \\ (Z+j\omega L_1) - EjL_0/k_1(Z+j\omega L_0) \quad (5)$$

in which E is the electromotive force generated in winding 14 or 15, $k_1$ and $k_2$ are the voltage attenuation factors of attenuators 44 and 49 respectively, and $\omega$ is $2\pi$ times the frequency.

The impedance Z will be chosen large compared with $Z_x$ or R or $\omega L_1$ or $\omega L_0$ so that Equation 5 reduces to $$Z_x = R/k_2 + j\omega(L_1-L_0)/k_1 \quad (6)$$

Equation 5 neglects the resistance of the inductance elements 47 and 48 which are supposed to be equal and therefore the corresponding voltage drops cancel out.

If the resistance R is, for example, about 1 ohm, the characteristic impedance Z of the attenuators may be, say, 5000 ohms, and then the errors of Equation 6 will be negligible.

If $R/k_2 = r$ and $(L_1-L_0)/k_1 = h$ then a closer approximation to the value of $Z_x$ is $$Z_x = r + j\omega h - r^2(k_2-1)/Z + h\omega^2 \\ (L_1+L_0-h)/Z + 2jrh\omega/Z \quad (7)$$

from which it can be seen that the error of Equation 6 in resistance is approximately $$h\omega^2(L_1+L_0-h)Z - r^2(k_2-1)/Z$$

and in reactance is $$2rh\omega/Z$$

It will be noted that the three contact resistances associated with the contacts 56, 57 and 58 all come directly in series with relatively high impedances. The contact 56 is in series with the primary winding of the transformer 55 which will present a high impedance at balance. 57 comes in series with Z, and 58 with R, which can usually be chosen sufficiently large to swamp the contact resistance. The resistance associated with 59 carries the current to both R and $Z_x$ and the voltage drop across the contact resistance is not included in the measurement.

Thus by the arrangement shown, the effect of the contact resistances can be rendered negligible. Any terminal arrangement which produces a similar result may evidently be used.

The arrangement shown for $L_0$ and $L_1$, besides avoiding the difficulty with their resistances, also enables both positive and negative reactances to be measured. $L_1$ may be for example a variable mutual inductance with the two windings connected in series, and $L_0$ may be a fixed coil with the same resistance as the two windings of $L_1$ together.

The attenuators 44 and 49 may be arranged to be adjusted in 10 decibel steps as in the case of Figure 2, and the elements 48 and 51 may each be given two scales in the ratio 3.162 to 1 as before.

It will be evident that in Figures 2, 7 and 9 the oscillator and detector may be interchanged without affecting any of the conditions for balance which has been explained. The invention is thus intended to cover both possibilities.

What is claimed is:

1. An electrical impedance bridge comprising a three winding transformer having two equal, balanced and closely coupled secondary windings forming ratio arms, means for supplying current from one of the secondary windings to a differential reactance through attenuating means, means for supplying current from the other secondary winding to the impedance to be measured and to a resistance in series, means for supplying a test current to the primary winding of the transformer, and means for applying the algebraic sum of the voltages across the differential inductance and across the resistance and test impedance to a detecting device 2. A bridge of the four-apex type for measuring the impedance or admittance characteristics of a test electrical circuit and with the first and third apices diagonally opposite to each other and the second and fourth apices diagonally opposite to each other, comprising two equal balanced and closely coupled inductive windings forming the first and second ratio arms of the bridge, one inductive winding being connected between the first and second apices and the other inductive winding being connected between the second and third apices, attenuator networks forming respectively the third and fourth arms of the bridge one of said attenuator networks being connected between the first and fourth apices and the other attenuator network being connected between the third and fourth apices, an adjustable differential impedance of known calibrated value connected between one attenuator network and the fourth apex, a known calibrated conductance connected between the other attenuator network and the fourth apex, circuit connections for coupling the test circuit to the first and fourth apices, and detector means connected to the second and fourth apices for determining when the bridge is balanced.

3. A bridge according to claim 2, in which said differential impedance comprises a differential capacitor.

4. A bridge according to claim 2, in which each attenuator network comprises two symmetrically-balanced half-sections.

5. A bridge according to claim 2, in which each attenuator network comprises two symmetrical and balanced half-sections, said differential impedance being in the form of a differential capacitor having differential plates connected respectively to each half-section of the first attenuator, and a cooperating plate connected to the fourth apex of the bridge.

6. A bridge according to claim 2, in which each of said attenuator networks comprises two symmetrical and balanced half-sections said adjustable impedance comprising a differential electrostatic condenser having a pair of differential plates connected respectively to the half-sections of the first attenuator, and a cooperating electrostatic plate connected to said fourth apex, said adjustable conductance comprising a resistance bridged across both half-sections of the other attenuator and having an adjustable contact element also connected to said fourth apex.

7. A bridge according to claim 2, in which each of said attenuator networks comprises two symmetrical and balanced half-sections with each half-section having substantially the same characteristic impedance.

8. A bridge according to claim 2, in which each attenuator network comprises two symmetrical and balanced half-sections each attenuator being adjustable and of constant characteristic impedance.

9. A bridge of the four apex type for measuring the impedance or admittance characteristics of an impedance element of unknown value and with the first and third apices diagonally opposite to each other and the second and fourth apices diagonally opposite to each, comprising two equally balanced and closely coupled inductive windings forming the first and second ratio arms of the bridge, one inductive winding being connected between the first and second apices and the other inductive winding being connected between the second and third apices, attenuator networks included respectively in the third and fourth arms of the bridge, one of said attenuator networks being of the balanced type and having associated therewith a variable impedance element to effect balance thereof, the other of said attenuators being unbalanced and having associated therewith an adjustable differential impedance of known calibrated value connecting said attenuator to said fourth apex, circuit means connecting said unknown impedance element to said first and fourth apices, and rectifier means connected to the second and fourth apices for determining when the bridge is balanced.

10. A bridge according to claim 9 in which said inductive windings comprise a second winding of a three winding transformer.

11. A bridge according to claim 9 in which the variable reactance associated with said first mentioned attenuator comprises a fixed inductance connected in series with a variable inductance, both fixed and variable inductances having substantially the same resistance.

BEN SECKER.

REFERENCES CITED

The following references are of record in the file of this patent:

UNITED STATES PATENTS

| Number | Name | Date |
|---|---|---|
| 2,162,894 | Logan | June 20, 1939 |
| 2,309,490 | Young | Jan. 26, 1943 |
| 2,326,274 | Young | Aug. 10, 1943 |

FOREIGN PATENTS

| Number | Country | Date |
|---|---|---|
| 483,023 | Great Britain | Apr. 11, 1938 |